Oct. 24, 1950　　　A. M. GARDNER　　　2,527,183
APPARATUS FOR FUSING EDGES OF PREVIOUSLY
CUT STRIP MATERIAL
Filed Nov. 28, 1947　　　2 Sheets-Sheet 1
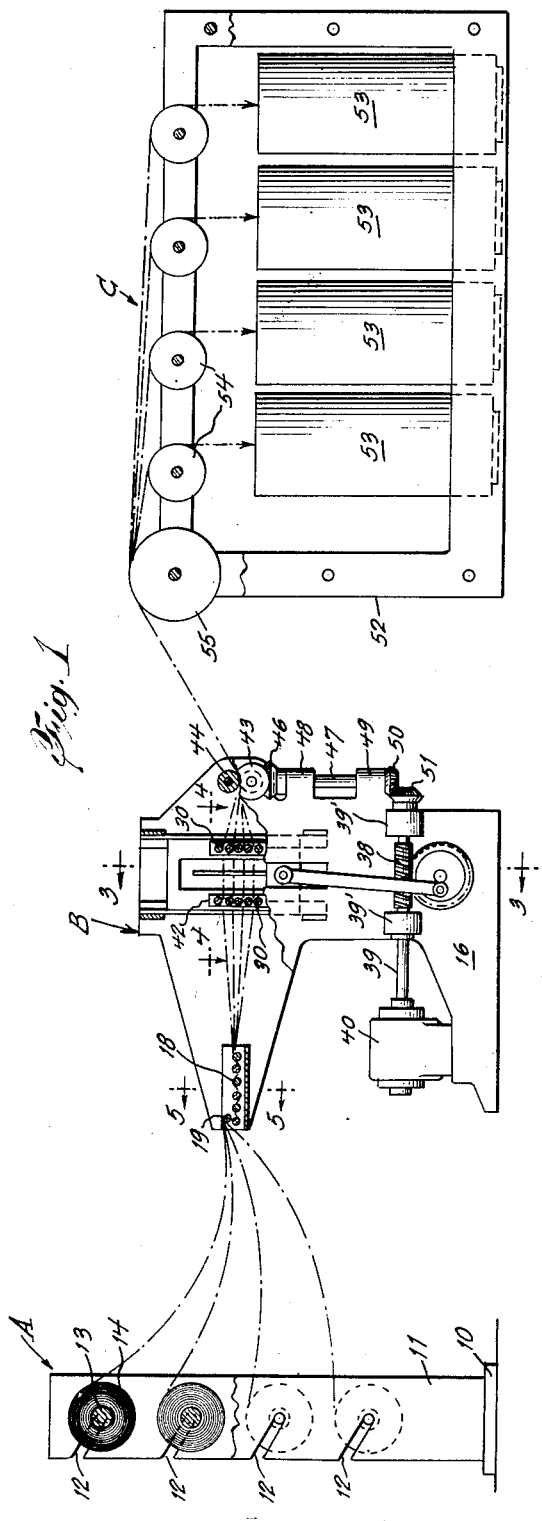
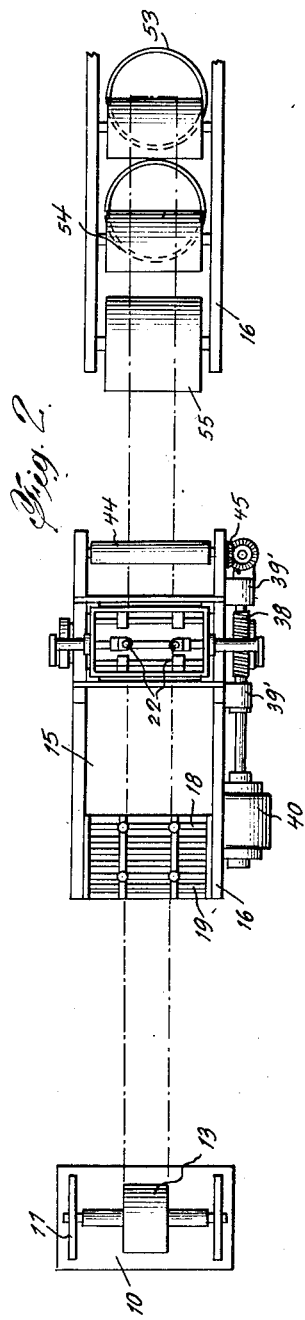
INVENTOR.
Anna M. Gardner.
BY
Robert J. Hulsizer Oct. 24, 1950  A. M. GARDNER  2,527,183
APPARATUS FOR FUSING EDGES OF PREVIOUSLY
CUT STRIP MATERIAL
Filed Nov. 28, 1947  2 Sheets-Sheet 2

INVENTOR.
Anna M. Gardner.
BY
Robert J. Hulsizer

Patented Oct. 24, 1950

2,527,183

UNITED STATES PATENT OFFICE 2,527,183

APPARATUS FOR FUSING EDGES OF PREVIOUSLY CUT STRIP MATERIAL

Anna M. Gardner, New York, N. Y., assignor to Fabric-Edging Machine Corporation, New York, N. Y., a corporation of New York Application November 28, 1947, Serial No. 788,708

4 Claims. (Cl. 18—1)

This invention relates to new and useful improvements in apparatus for treating woven material especially that sort of material which is composed of chemically produced threads and one form of which is known as "acetate" material.

Before "acetate" material or threads were known and used and woven into sheets and cut into strips, the only way in which the ravelled edges of such strips could be bound together was by such processes as pasting or glueing or dipping in some glutinous substance. This has generally heretofore been done by dipping the disk of strip material against a glutinous surface and by applying the glue to the flat edge area at one time with a brush or similar means. This method has tended to cement the adjacent runs of the material together with consequent bad results.

Later, when "acetate" material was made and need for fusing the edges was recognized, an attempt to fuse the material was made by taking a sheet of "acetate" material and running it through a machine in which were disposed heated wires or hot knives which would, in one operation, not only cut the sheet into strips but also fuse the edges at the same time. This might have been good but for the fact that the wires would heat unevenly and would sometimes overheat and bend and expand, giving a distorted cut, which involved great waste of material because of unevenness in the produced strips. When heated knives were used they would also heat unevenly and cause unevenness in the fusion of the edges thereby also creating great wastage in production of perfectly, evenly fused strip edges.

As far as applicant knows, she is the first one who has ever taken material which has already been cut along its edges, whether in the form of sheets or ribbons, and run this already cut material into a machine containing a heating element of inflexible material, such as a stiff rod or tube containing a heating element, so that the cut edges pass into close controlled proximity to the heating element, while relative vertical motion between the material and the heating element is produced preferably by moving the material up and down along the heated rod while it is advancing past the heated surface of the same.

A further object is to provide a simple, rugged, economical, apparatus which is effective to fuse edges moving past the heating point at high speed and which is practically automatic in its action and requires a minimum of care and attention during the operation thereof.

Further and more specific objects, features, and advantages will more clearly appear from a consideration of the detailed specification hereinafter set forth especially when taken in connection with the accompanying drawings which illustrate a present preferred form which the apparatus may assume to embody the method and which forms part of the specification.

In brief and general terms, the method of employing the apparatus comprises fusing the previously cut edge of a length of material. Preferably, although not necessarily, it involves such a fusion while the length or strip is moving past a heating point. It further includes passing a previously cut length of "acetate" material past a heating point, guiding it edgewise throughout its travel, and then passing it to a distribution point.

Further the method includes passing a previously cut length of material past an inflexible heating rod or tube, and moving it up and down the rod while in motion to alter the point of contact between the material and the heating surface.

Still further the method includes passing the material in a series of over-laid strips of previously cut length through a tensioning device, guiding the material along a defined line of travel throughout its entire movement, passing the material past a heating element, separating the separate lengths of material as they pass the heating element so that they separately are heated, and then moving the material up and down cyclically along the heating element as they move forward past the same.

Other features of the apparatus will be clear from the following specification and detailed drawings.

A preferred form which the invention may presently assume, is illustrated in the drawings, of which, Fig. 1 is a general side elevation of the apparatus;

Fig. 2 is a general plan view thereof;

Figure 3:
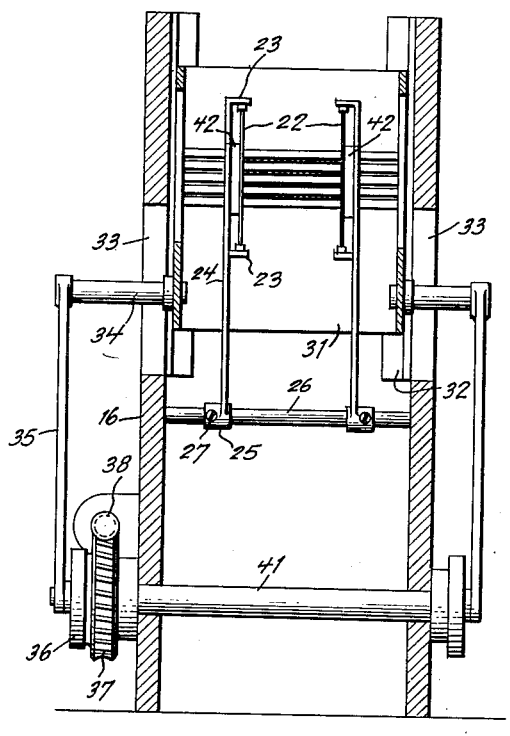
Fig. 3 is a vertical cross section taken on the line 3—3 of Fig. 1.

Referring now merely to the specific preferred form of the invention as shown in the drawing, it will be observed that the sheet material, herein shown in the form of series of four narrow strips, are drawn from spools on a support A, through an edge-fusing unit B, and then into a distributor unit C (Fig. 1). The support A comprises a base plate 10, side plates 11 with inclined slots 12 to receive shafts 13 of spools 14 of strips or sheeting as the case may be, the edges of which are to be fused. The edges of these materials are previously cut by any suitable means. The material in this method and apparatus is known in the trade as "acetate" material which is formed of chemically produced threads woven together and this apparatus and method is intended to be effective upon any such material the edges of which are fusible whether of "acetate" material or equivalent material the previously cut edges of which are required to be fused to prevent ravelling. In the form shown, several strips are shown whereas one strip alone may be treated if desired.

The feeding and heating unit B comprises a base plate 15, side frame plates 16 at the rear upper portions of which is disposed therebetween and supported a material-guiding and tensioning device comprising a shallow box-like frame 17 in which a series of tensioning bars 18 are disposed in a spaced row transversely of the frame with an extra auxiliary guide and tensioning bar 19 disposed over the first of the tensioning bars 18 as shown. These bars or rods may be fixed or may be rotatable as desired. As shown in Fig. 1, the strips may pass over and around the bar 19 and then pass over and under the series of rods 18 in succession and in so doing they are held under tension. In order to guide the strips laterally and keep them in an exact line of travel straight from the support A to the heating unit B, a pair of guide plates 20 are mounted slidably on the rods 18 and are slidable laterally with respect to the frame 17. They are held in laterally adjusted position by set screws 21 and can be independently adjusted for any width of material which is to pass through the tensioning unit. They are adjusted so that they barely touch the edges of the material so as to keep it in exact alinement with the single straight line along which the material travels through the entire machine, as can be seen particularly in Fig. 2.

Figure 5:
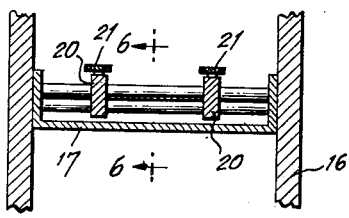
Fig. 5 is a vertical cross section taken on the line 5—5 of Fig. 1.
Figure 6:
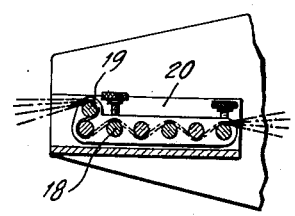
Fig. 6 is a vertical cross section taken on the line 6—6 of Fig. 5.
Figure 7:
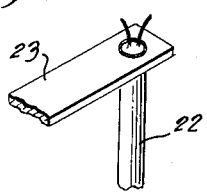
Fig. 7 is a small perspective view of the heating tube.
Figure 8:
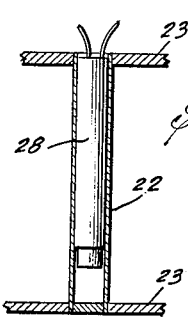
Fig. 8 is a vertical section through the heating tube.

The overlapped series of strips are shown in Fig. 5 by a single line but it is understood that this is for drawing convenience only. After leaving the tensioning means thus described, the material passes between a pair of spaced vertical heating elements in the form of rods or tubes 22 which are mounted between plates 23 fixed to upright standards or bars 24 provided with collars 25 at their lower ends surrounding a shaft 26 and fixed thereto by means of set screws 27. By means of the set screw attachment, the tubes 22 may be moved toward or from each other in accordance with the width of the material passing between the tubes so that the proximity of the heating tubes to the edge of the material to be fused may be determined by finely adjustable degrees. The detail construction of the heating tubes is shown in Figs. 7 and 8. In these it is shown that each tube or unit is a hollow tube preferably of highly polished steel with the upper open end extending through the top plate 23 and into this open end is inserted a heating shell 28 or cartridge containing any usual heating elements surrounded by layers of insulation and provided with wires 29 to be connected to any suitable source of power. The wires extend out of the top of the cartridge within each tube and this permits the cartridges to be removed and inserted at will. The length of the cartridge is substantially equal to the length of the tube 22 so that the heat will be uniformly maintained all along the length thereof. These tubes may or may not be fixed or rotatable as desired.

If the sheet or strips or the series of overlying strips shown, are passed between the heater elements at one constant level all the time, the effectiveness of the heating elements may be impaired by too long contact with the fusible edges of the material and to avoid this prolonged contact at any one point, the material is moved up and down along the length of the tubes 22 in a repeated series of reciprocatory movements. To achieve this result the material is passed between a series of horizontal rods arranged in a vertical row both in front of the tubes 22 and to the rear thereof. These rods 30 are mounted horizontally between side walls of a frame member 31 or casing having open front and rear faces and adapted to move up and down between the side plates 16 of the unit B and are guided in this movement by means of angle guide bars 32. The side plates 16 are provided with vertical slots or channels 33 through which extend stub shafts 34 connected at one end to the walls of the casing 31 and at the other end to a link 35 the other end of which is eccentrically connected to the side of a rotating disk 36 fixed to the side of a worm wheel 37 driven by a worm gear 38 on a shaft 39 journalled between bosses 39' on the frame of unit B and connected to an electrical drive motor 40, also mounted on the base of the frame of the unit B. The worm wheel 37 and the disk 36 are connected to a cross shaft 41 (Fig. 3) which extends across between the side walls 16 and has on the other end a similar eccentric disk and set of connecting elements connected to the other side of the casing so as to get a balanced action and effect of movement in the casing up and down in the guide channel bars 32 whereby the motion is smooth and even at all times.

Figure 4:
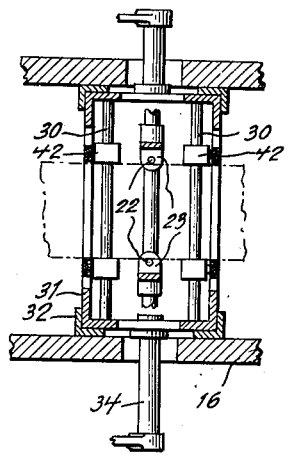
Fig. 4 is a horizontal cross section taken on the line 4—4 of Fig. 1.

The material either in a single layer or a series of layers is guided in its motion through these sets of bars 30 by means of guide plates or bars 42 disposed on each set of bars 30 as shown in Figs. 3 and 4 and are similar in shape, construction, and function to those bars 20 referred to in regard to Fig. 5 since the series of bars in Fig. 5 are disposed in a horizontal series whereas the series of bars 30 in Figs. 3 and 4 are vertical. Except for this difference in the planar disposition of the two sets of bars they are identical in construction and arrangement. However, the material in passing through the sets of bars 30 do not interweave therewith but pass straight through as shown in Fig. 1, each strip of the series of overlaid strips passing between a different pair of bars 30 so that while being heated and having their edges fused the strips are definitely separated and contact different spots on the heating tubes. Whereas the set of bars 20 are tensioning bars, the sets of bars 30 are merely guide bars and in conjunction with the side guide bars 42 on the sets of bars 30 accurately space and direct the forward motion of the strips so as again to maintain their movement along that required straight line above mentioned. It is imperative that the movement of the strips with respect to the heating tubes be accurately guided and controlled so that the edges are at the exact proper distance from the surface of the tubes if not in actual contact therewith. Whether the strip cut edges are in actual contact or not depends upon the character of the material whose edges are being fused and also upon the degree of heat used in the heating tubes.

The pull on the material to draw it off the spools 14 and through the tensioning means and the heating unit is created by a pair of rollers 43 and 44 mounted on shafts between the side plates 16 of the unit B. The lower roller 43 is driven by having a bevel gear 45 at one end of its shaft meshing with a bevel gear 46 on a vertical shaft 47 supported between bosses 48 and 49 on the frame of unit B. This shaft 47 has at its lower end a bevel gear 50 meshing with a bevel gear 51 on the end of shaft 39, above mentioned, which is driven by the drive motor 40. The top roller 44 is adapted to rest by gravity or spring pressure on the lower roller 43 and create sufficient pressure to grip the material as it passes therebetween as shown in Fig. 1, the series of layers of material at this point being brought together again to pass between the rollers 43 and 44.

Now, to make of the method a continuous complete procedure, it is desired to distribute the series of strips into separate storage spaces or compartments now that they have been treated along their edges by the heater tubes 22. To this end, there is provided a unit C which comprises a frame member 52 in which, in any suitable manner are disposed a series of upright receptacles 53 or tanks, or bins into which the material strips as they are separated may drop. To achieve this result the upper portion of the frame 52 is provided with a plurality of roller 54 suitably mounted and driven, in any suitable manner not shown, from the drive motor 40, and each one is disposed over a particular tank 53. On the end of the top of the frame 52 is a larger roller 55, also driven, over which the series of strips passes in proceeding from the feed rollers 43 and 44 to the distributor unit C. It will be apparent from Fig. 1 that as the lower layer of fused strip reaches the first bin it will drop by gravity thereinto while the other strips are guided to proceed beyond. The second strip is caused to drop into the second bin and so on. Of course the number of bins employed, with their associated frames and rollers, is determined by the numbers of the layers of sheeting or strips which are being passed through the device at one time. Therefore I have provided a simple and efficient means whereby a series of strips are automatically separated and passed into separate storage chambers with ease and dispatch.

Assuming that, as shown, four strips which have their edges previously cut, are to be run through the device. To start the operation, the strips are pulled off the spools 14 and threaded through the tensioning device and through guide bars 30, between the heating tubes, and through the feed rollers 43 and 44, and then are passed over the rollers on the distributor frame, each one in its turn being allowed or guided to drop down into its particular tank. When the material has thus been initially disposed, then the power is turned on so that the rollers 43 and 44 and the rollers 54 and 55 are driven at relative speeds previously determined, after which the operation is practically automatic with the strips being guided along an absolutely straight line from each spool 14 through the tensioning device and the heating units by means of the guide bars 20 on the tensioning device and bars 42 on the reciprocatory bars 30 disposed both in front of and behind the heating tubes. Thus the line of travel is kept certain so that each edge passes at the proper distance from the heating tubes whether or not that distance is zero or some other determined value as above stated. While the strips are thus passing through the machine, the frame or casing supporting the bars 30 is being moved up and down by the eccentric drive described and this moves the separate strips up and down with respect to the heating tubes so that as the succeeding portions of the moving strips pass the heating point they contact constantly different points on the tubes and therefore, for the reasons stated, maintain the heating effect of the tubes uniform at all times. In this manner the edges are fused evenly and the material may be run through the device at a high rate of speed. The material having already been cut along its edges before it is placed in the machine, the rate of speed can be much higher than if it were to be cut as well as fused as heretofore.

Thus it will be seen that I take rolls of material, the edges of which are already cut whether this material is in sheet form or in the form of narrow ribbons or strips and introduce one or more of these rolls into my fusing machine so that they are passed in a completely guided and controlled manner by a series of inflexible heating elements in the form of tubes or rods disposed on opposite sides of the material so as to simultaneously fuse the opposite edges thereof. It makes no difference how wide the material is whether it is only a half inch wide or whether it is three feet wide. This is a mere matter of variation in the spacing of the parts on the machine. It is also to be noted that in this machine there is absolutely no cutting of the material. Therefore, this machine permits a rapid and efficient sealing or fusing of cut edges by heating means which can be used day after day to produce endless amounts of lengths of material with fused edges and of absolutely uniform width. In this machine the heating elements scarcely ever require any attention and do not bend or break to either stop the machine or affect the width of the material being produced and can be run at a very rapid rate of speed.

While the invention has been described with respect to a present preferred form which it may assume, it is not to be limited to such details and forms since many changes and modifications of the invention may be made in the invention without departing from the spirit and scope thereof in its broadest aspects. Hence it is desired to cover any and all forms and modifications of the invention which may come within the language or scope of any one or more of the appended claims.

What I claim as my invention, is:

1. An apparatus for fusing the edges of previously cut material comprising spaced inflexible heating elements, a series of horizontal rods disposed in vertical alignment in front and to the rear of said elements, whereby lengths of said previously cut material may be passed between pairs of said rods and between the edges of said elements, and means to move said sets of rods up and down while the material is advancing between the elements.

2. An apparatus for fusing the edges of strips of fusible material including spaced heating elements, a plurality of supporting means disposed in substantial vertical alignment on opposite sides of the heating elements guiding said strips in superposed relation as they are passed between the elements, and means causing relative movement between said heating elements and said supporting means as the material advances past the elements.

3. An apparatus for fusing the edges of previously cut material comprising spaced inflexible heating elements, a series of horizontal rods disposed in substantial vertical alignment in front and to the rear of said elements, whereby lengths of said previously cut material may be passed between pairs of said rods and between the edges of said elements, and means causing relative movement between said sets of rods and said heating elements while the material is advancing therebetween.

4. An apparatus for fusing the edges of previously cut material comprising a set of spaced inflexible heating rods, a series of horizontally disposed bars in vertical alignment in front and in the rear of said rods whereby lengths of said previously cut material may be passed between pairs of said bars and between the edges of said rods, means causing relative movement between said sets of bars and the rods, and means to accurately edge guide the material in its travel to maintain a fixed relation between the edges of the material and the surface of the heating rods.

ANNA M. GARDNER.

REFERENCES CITED

The following references are of record in the file of this patent:

UNITED STATES PATENTS

| Number | Name | Date |
|---|---|---|
| 1,871,046 | Dickie | Aug. 9, 1932 |
| 2,035,138 | Maxfield | Mar. 24, 1936 |
| 2,271,192 | Hinz | Jan. 27, 1942 |
| 2,273,162 | Willard | Feb. 17, 1942 |
| 2,324,838 | Harz et al. | July 20, 1943 |
| 2,377,896 | Metzner | June 12, 1945 |